(12) United States Patent
Arita et al.

(10) Patent No.: US 9,552,797 B2
(45) Date of Patent: Jan. 24, 2017

(54) MAP DISPLAY DEVICE AND MAP DISPLAY METHOD

(75) Inventors: Hidekazu Arita, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 172 days.

(21) Appl. No.: 14/358,974

(22) PCT Filed: Jan. 12, 2012

(86) PCT No.: PCT/JP2012/050515
§ 371 (c)(1),
(2), (4) Date: May 16, 2014

(87) PCT Pub. No.: WO2013/105255
PCT Pub. Date: Jul. 18, 2013

(65) Prior Publication Data
US 2014/0327703 A1    Nov. 6, 2014

(51) Int. Cl.
| | |
|---|---|
| *G09G 5/377* | (2006.01) |
| *G06T 11/60* | (2006.01) |
| *G06T 3/40* | (2006.01) |
| *G09G 5/373* | (2006.01) |
| *G01C 21/36* | (2006.01) |

(52) U.S. Cl.
CPC ............ *G09G 5/377* (2013.01); *G01C 21/3667* (2013.01); *G06T 3/40* (2013.01); *G06T 11/60* (2013.01); *G09G 5/373* (2013.01); *G06T 2200/28* (2013.01); *G09G 2340/045* (2013.01); *G09G 2340/12* (2013.01)

(58) Field of Classification Search
None
See application file for complete search history.

(56) References Cited

U.S. PATENT DOCUMENTS

| | | | |
|---|---|---|---|
| 8,692,853 B2* | 4/2014 | Kim ................... | G06F 3/04815 345/629 |
| 2007/0101290 A1* | 5/2007 | Nakashima .......... | G01C 21/265 715/797 |

(Continued)

FOREIGN PATENT DOCUMENTS

| | | |
|---|---|---|
| CN | 1959349 A | 5/2007 |
| JP | 2001-174271 A | 6/2001 |

(Continued)

*Primary Examiner* — Maurice L McDowell, Jr.
*Assistant Examiner* — Donna J Ricks
(74) *Attorney, Agent, or Firm* — Birch, Stewart, Kolasch & Birch, LLP

(57) ABSTRACT

An object of the present invention is to provide a map display device and a map display method that facilitate comprehension of relevance between drawing objects in a plurality of map drawing pictures and improve user operability. The map display device according to the present invention includes: a controller that controls an overlapping state between the first and second drawing pictures in accordance with the input of user operation and outputting, to a display unit, a picture in which one of the first and second drawing objects masks the other in a portion in which the first and second drawing pictures overlap each other. The controller controls the overlapping state to prevent the priority drawing object in the first drawing picture from becoming invisible in the drawing picture display.

19 Claims, 14 Drawing Sheets

(56) References Cited

U.S. PATENT DOCUMENTS

2011/0310123 A1* 12/2011 Matsubara ......... H04N 5/44582
　　　　　　　　　　　　　　　　　　　　　　　345/634
2011/0320117 A1* 12/2011 Sempuku ............ G01C 21/367
　　　　　　　　　　　　　　　　　　　　　　　701/425

FOREIGN PATENT DOCUMENTS

| JP | 2002-296046 | * | 10/2002 | ............ G01C 21/00 |
| JP | 2002-296046 A | | 10/2002 | |
| JP | 2008-83108 A | | 4/2008 | |
| JP | 2010-190593 | * | 9/2010 | ............ G01C 21/00 |
| JP | 2010-190593 A | | 9/2010 | |
| JP | 2011-169621 A | | 9/2011 | |

* cited by examiner

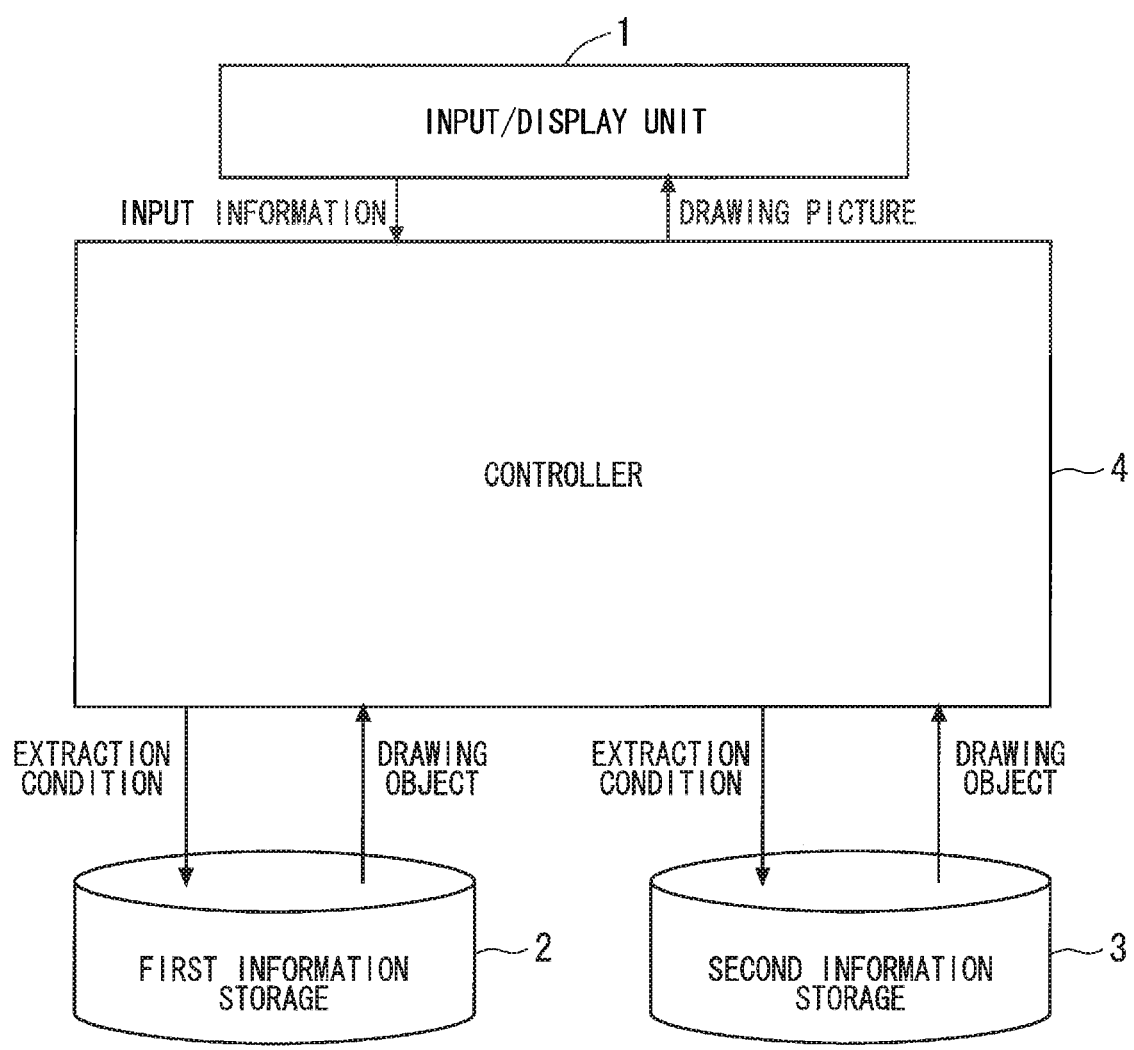
F I G . 1

FIG. 8
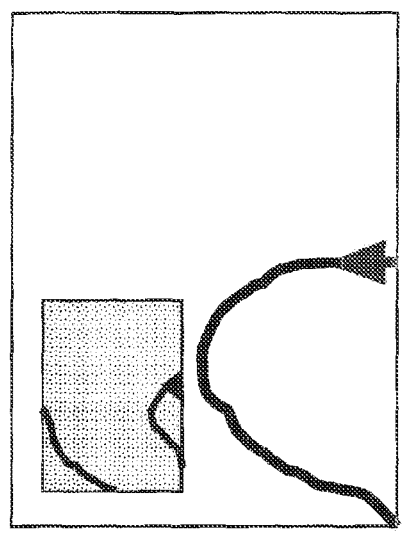
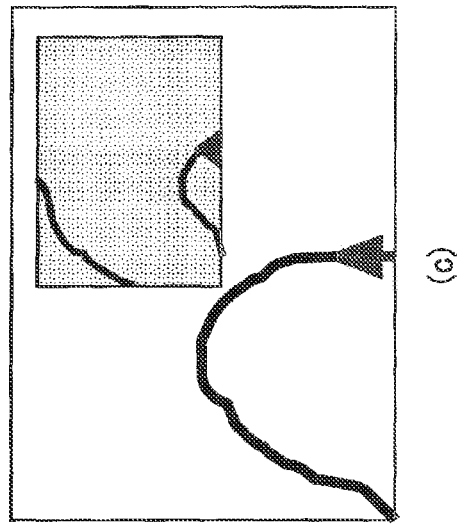
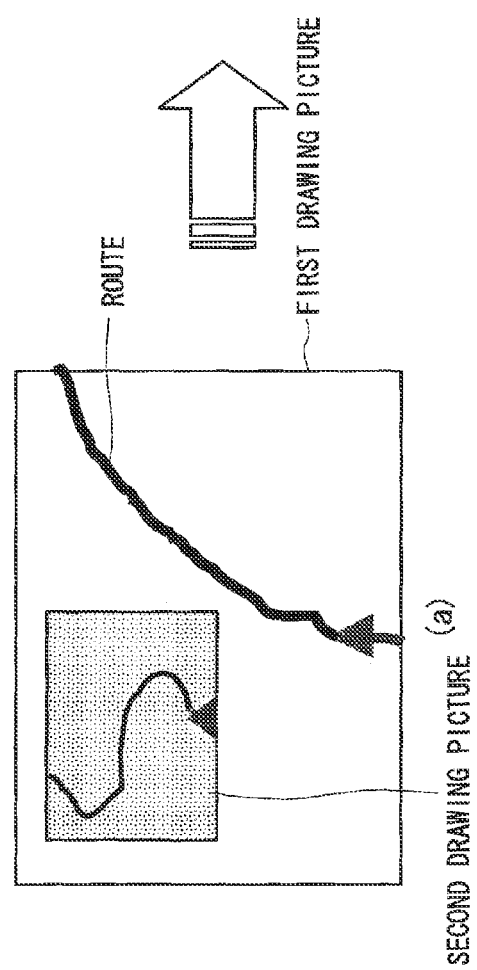

FIG. 11
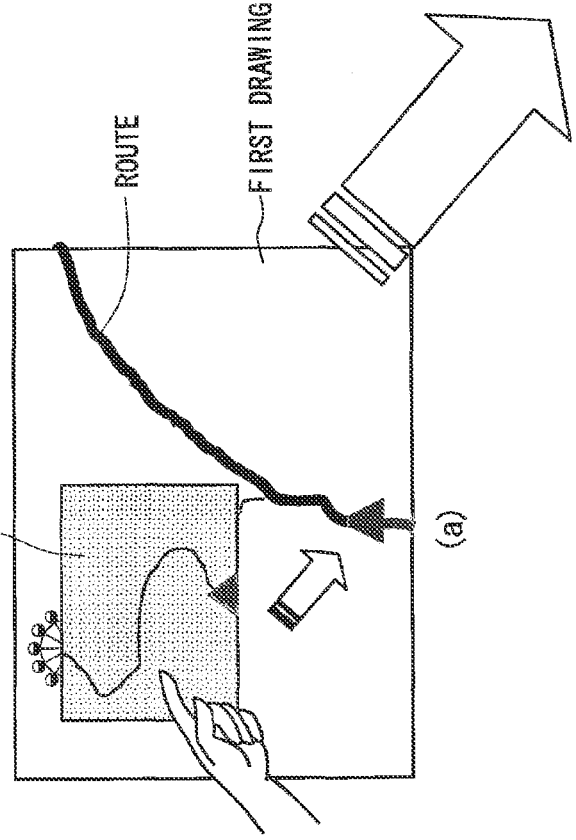
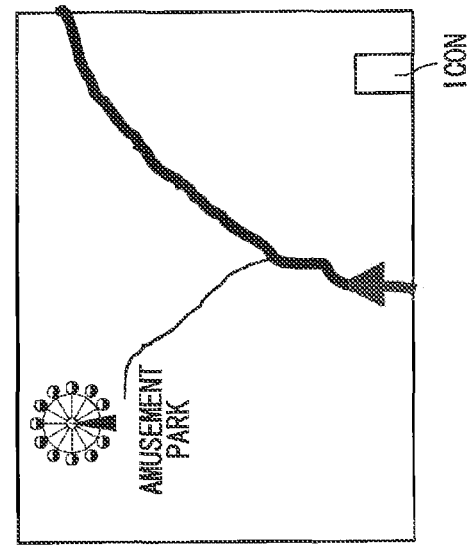

FIG. 12
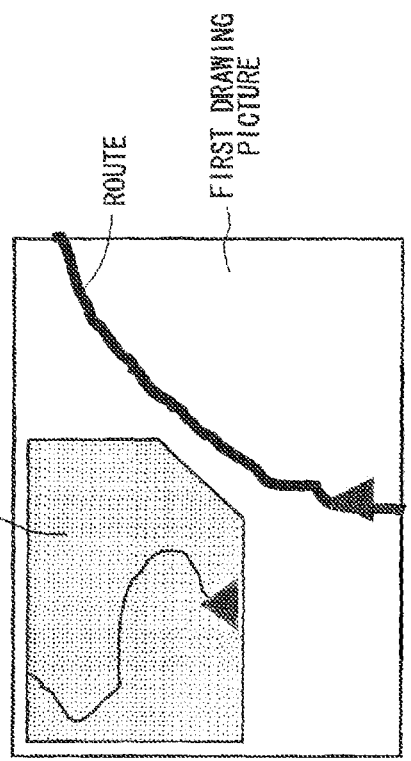
(a)
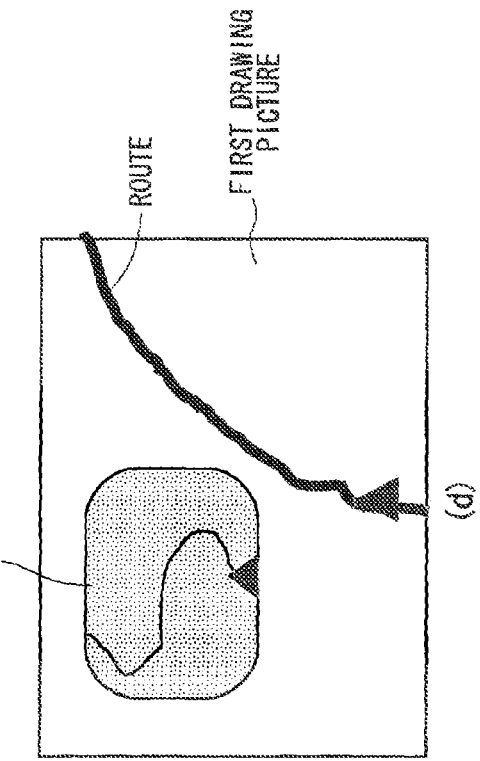
(b)
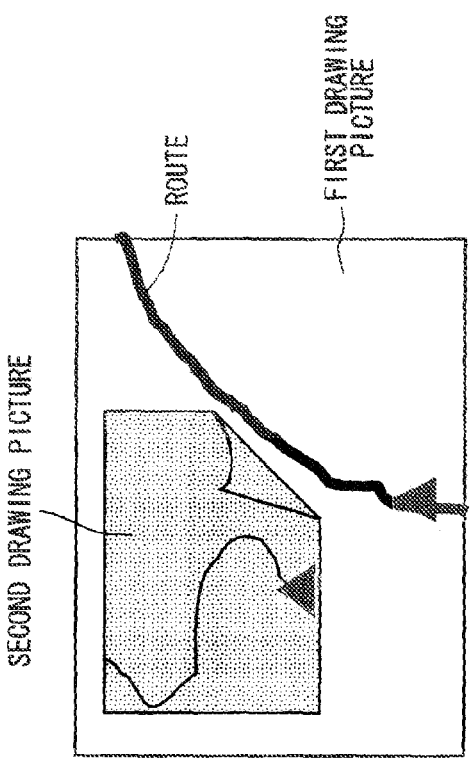
(c)
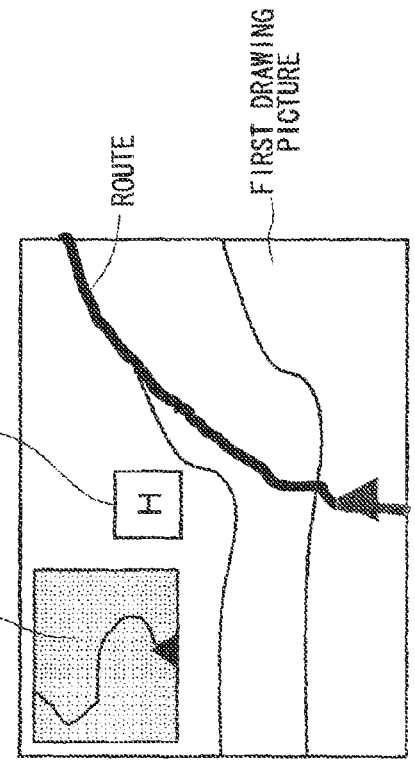
(d)

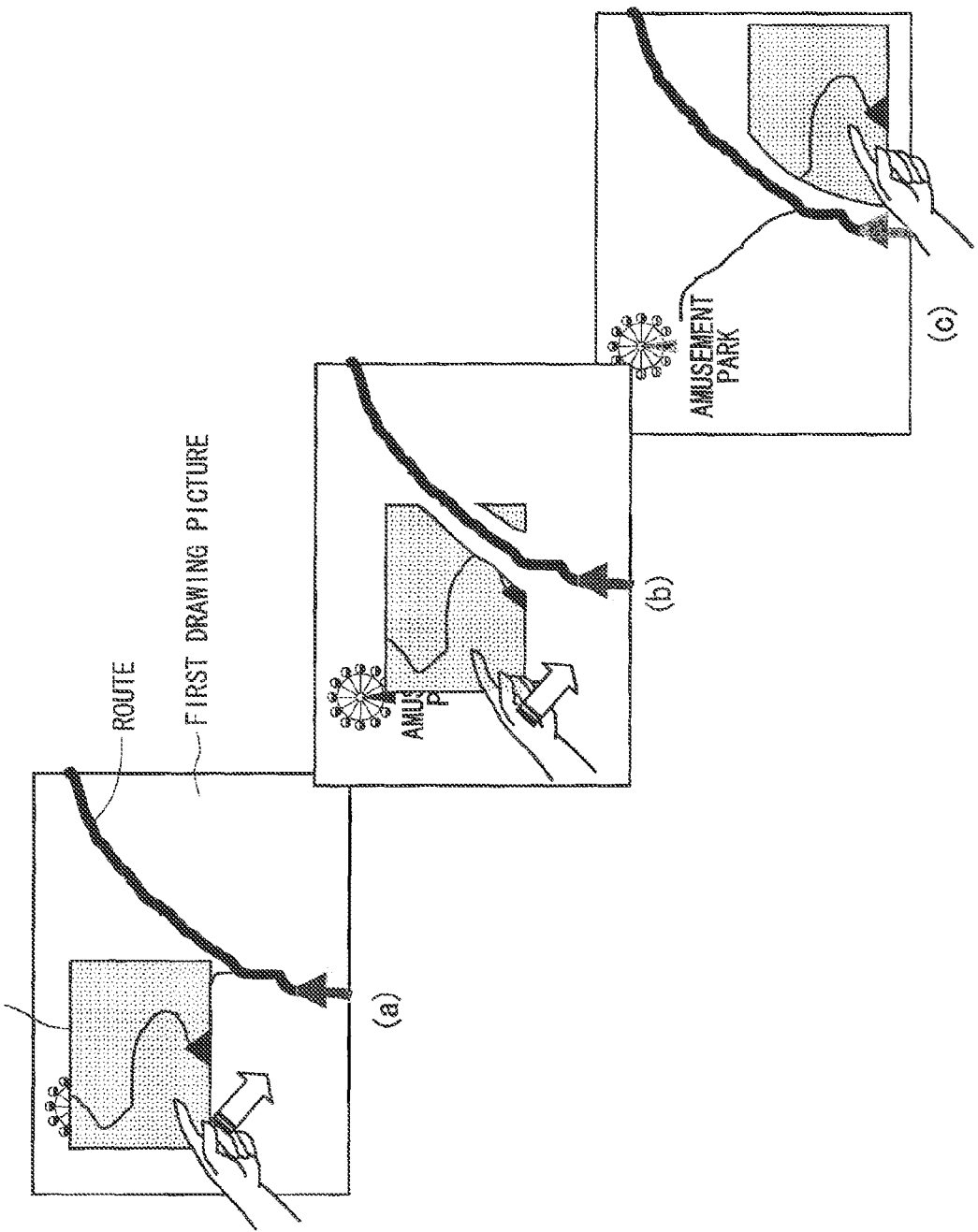

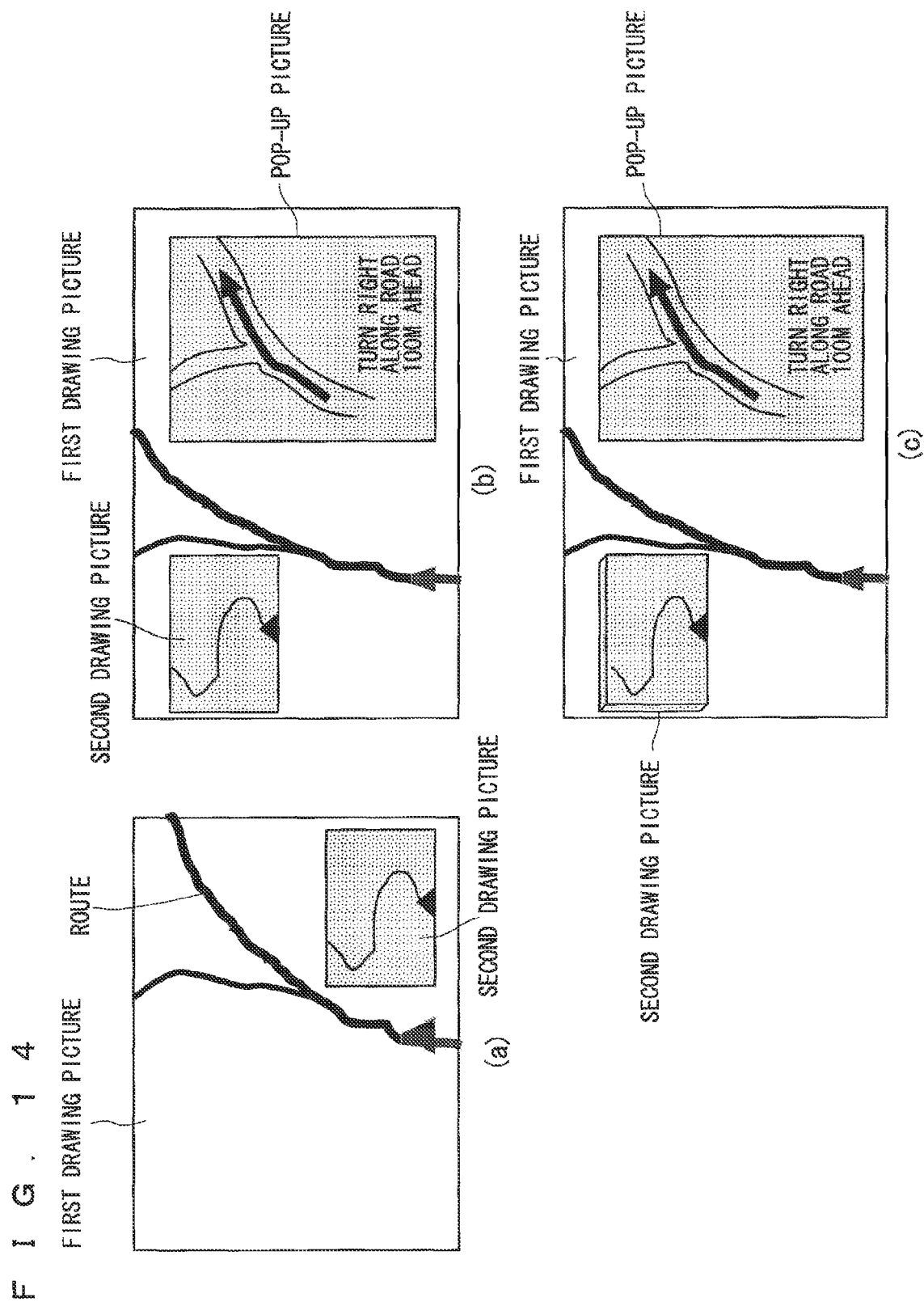

MAP DISPLAY DEVICE AND MAP DISPLAY METHOD

TECHNICAL FIELD

The present invention relates to a map display device and a map display method, and particularly relates to a map display device and a map display method for displaying a plurality of map pictures on a display screen.

BACKGROUND ART

In an exemplary map display method of displaying a plurality of map pictures on a display screen, the display screen is divided into two regions and a map drawing picture around a current position of a vehicle or the like is displayed in each of the regions (see Patent Document 1). In the map drawing picture, a displayed map includes a drawing object such as a road line, a character, topography, a building, an icon, a background color (possibly a transparent or translucent color), or associated information. The display screen is a display for actually displaying such map drawing pictures. The map drawing picture is displayed in a predetermined display region in the display screen.

According to this map display method, one of the display regions displays a map drawing picture related to route guide and the other one of the display regions displays a map drawing picture related to similar route guide on a different scale. The map display method is thus useful for a user.

In the map display method according to Patent Document 1, a boundary between right and left display regions can be varied to further enhance the convenience.

PRIOR ART DOCUMENT

Patent Document

Patent Document 1: Japanese Patent Application Laid-Open No. 2001-174271

SUMMARY OF INVENTION

Problems to be Solved by the Invention

There has been a problem that it is not always easy to comprehend relevance between the drawing objects displayed respectively in the plurality of map drawing pictures that are displayed simultaneously in accordance with the map display method mentioned above.

For example, in a case where, out of the map drawing pictures indicating the vehicle current position, one includes expressways and the other one includes ordinary roads, or in a case where one of the map drawing pictures is a planar map drawing picture and the other one is a relief map drawing picture, a user has been required to compare display regions and determine in accordance with a landmark building or the like in order to comprehend how drawing objects in the map drawing pictures respectively displayed in these display regions correspond to each other.

The present invention has been achieved to solve the above problems, and an object of the present invention is to provide a map display device and a map display method for displaying a plurality of map drawing pictures. The device and the method therefor can facilitate comprehension of relevance between drawing objects included respectively in the map drawing pictures and improve user operability.

Means for Solving the Problems

In order to solve the problems mentioned above, the present invention provides a map display device that displays a plurality of drawing pictures including a first drawing picture and a second drawing picture in an at least partially overlapping manner, the first drawing picture displaying a first drawing object, the second drawing picture displaying a second drawing object, the first drawing object being a drawing object related to map information, and the second drawing picture or the second drawing object displayed in the second drawing picture being smaller in size than the first drawing picture, the map display device including: an input unit that receives input of user operation related to display of a drawing picture; a priority drawing object storage that stores a priority drawing object included in the first drawing object designated by input of user operation received by the input unit; and a controller that controls an overlapping state between the first and second drawing pictures in accordance with the input of user operation received by the input unit and outputting, to a display unit, a picture in which one of the first and second drawing objects masks the other in a portion in which the first and second drawing pictures overlap each other; wherein the controller controls the overlapping state to prevent the priority drawing object in the first drawing picture from becoming invisible in the drawing picture display.

Furthermore, the present invention provides a map display method of displaying a plurality of drawing pictures including a first drawing picture and a second drawing picture in an at least partially overlapping manner, the map display method being embodied by motions of a computer including an input unit, a storage, a display unit, and a controller, the first drawing picture displaying a first drawing object, the second drawing picture displaying a second drawing object, the first drawing object including a drawing object related to map information, and the second drawing picture or the second drawing object displayed in the second drawing picture being smaller in size than the first drawing picture, the map display method including the steps of: (a) receiving, by the input unit, input of user operation related to display of a drawing picture, (b) storing, by the storage, a priority drawing object included in the first drawing object designated by input of user operation received in the step (a); (c) displaying, by the display unit, the plurality of drawing pictures including the priority drawing object; and (d) prior to the step (c), by the controller, controlling an overlapping state between the first and second drawing pictures in accordance with the input of user operation received in the step (a), and masking one of the first and second drawing objects with the other in a portion in which the first and second drawing pictures overlap each other; wherein the overlapping state is controlled in the step (d) to prevent the priority drawing object in the first drawing picture from becoming invisible in the drawing picture display.

Effects of the Invention

According to the present invention, in a map display device that displays a plurality of drawing pictures including a first drawing picture and a second drawing picture in an at least partially overlapping manner, the first drawing picture displays a first drawing object, the second drawing picture displays a second drawing object, the first drawing object being a drawing object related to map information, and the second drawing picture or the second drawing object displayed in the second drawing picture being smaller in size than the first drawing picture, the map display device includes: an input unit that receives input of user operation related to display of a drawing picture; a priority drawing object storage that stores a priority drawing object included in the first drawing object designated by input of user operation received by the input unit; and a controller that controls an overlapping state between the first and second drawing pictures in accordance with the input of user operation received by the input unit and outputting, to a display unit, a picture in which one of the first and second drawing objects masks the other in a portion in which the first and second drawing pictures overlap each other; wherein the controller controls the overlapping state to prevent the priority drawing object in the first drawing picture from becoming invisible in the drawing picture display. This configuration facilitates comprehension of relevance between the drawing objects in the plurality of map drawing pictures and improves user operability.

Furthermore, according to the present invention, in a map display method of displaying a plurality of drawing pictures including a first drawing picture and a second drawing picture in an at least partially overlapping manner, the map display method being embodied by motions of a computer including an input unit, a storage, a display unit, and a controller, the first drawing picture displays a first drawing object, the second drawing picture displays a second drawing object, the first drawing object includes a drawing object related to map information, and the second drawing picture or the second drawing object displayed in the second drawing picture being smaller in size than the first drawing picture, the map display method includes the steps of: (a) receiving, by the input unit, input of user operation related to display of a drawing picture, (b) storing by the storage, a priority drawing object included in the first drawing object designated by input of user operation received in the step (a); (c) displaying, by the display unit, the plurality of drawing pictures including the priority drawing object; and (d) prior to the step (c), by the controller, controlling an overlapping state between the first and second drawing pictures in accordance with the input of user operation received in the step (a), and masking one of the first and second drawing objects with the other in a portion in which the first and second drawing pictures overlap each other; wherein the overlapping state is controlled in the step (d) to prevent the priority drawing object in the first drawing picture from becoming invisible in the drawing picture display. This configuration facilitates comprehension of relevance between the drawing objects in the plurality of map drawing pictures and improves user operability.

The objects, features, aspects, and advantages of the present invention will be made more obvious with reference to the following detailed description and the accompanying drawings.

BRIEF DESCRIPTION OF DRAWINGS

FIG. 1 is a view showing a conceptual entire configuration of a map display device.

FIG. 8 is a view illustrating behavior according to a specific example, of the map display device.

FIG. 11 is a view illustrating behavior according to a specific example, of the map display device.

FIG. 12 is a view illustrating behavior according to a specific example, of the map display device.

FIG. 13 is a view illustrating behavior according to a specific example, of the map display device.

FIG. 14 is a view illustrating behavior according to a specific example, of the map display device.

DESCRIPTION OF EMBODIMENTS

Embodiment 1

<Configuration>

Figure 2:
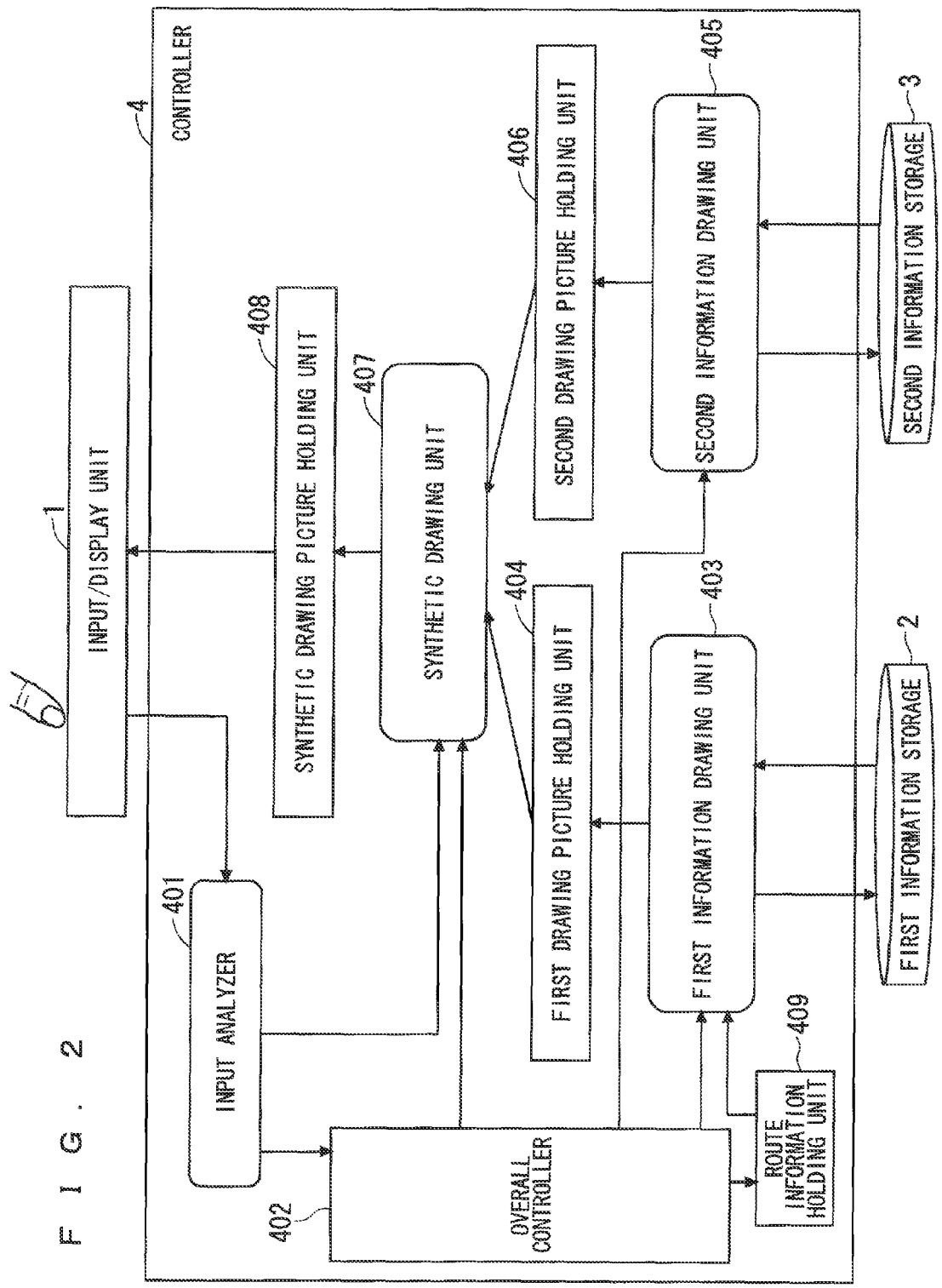
FIG. 2 is a view showing a conceptual configuration of a controller in the map display device.

A conceptual entire configuration of a map display device according to an embodiment 1 is described with reference to FIG. 1. The map display device is not particularly limited in terms of its purpose of use. The map display device according to the following embodiment described below is assumed to be a car navigation system equipped on a vehicle as a mobile object.

As shown in FIG. 1, the map display device includes an input/display unit 1, a controller 4, a first information storage 2, and a second information storage 3. The input/display unit 1 receives input information as intended by a user and displays the information. The controller 4 controls behavior of displaying a map drawing picture at the input/display unit 1 in accordance with the input information received by the input/display unit 1. The first information storage 2 and the second information storage 3 each store a drawing object and the like related to map information to be referred to upon behavior control by the controller 4.

The drawing object is displayed in a drawing picture and includes a road line, a character, a topography, a building, an icon, a background color (possibly a transparent or translucent color), associated information, or the like. The background color included in the drawing object (a background object) is not necessarily painted uniformly but can have gradation or can be painted partially in a drawing picture.

The input/display unit 1 is embodied by a touch panel (a display device including a touch panel) or the like. The touch panel receives user's contact (touch) on a display screen and analyzes a touched position, a motion, and the like on the display screen to comprehend user's intention. Expected user's intention can be operation on a displayed map, a route search command, operation on built-in audio equipment, or the like. Examples of such map operation include changing a scale, changing a display position on a map (scrolling), searching for information on a current position and its periphery, and comparing the information.

The first information storage 2 and the second information storage 3 each store a drawing object related to map information or the like. More specifically, the first information storage 2 and the second information storage 3 each store map data on topography or the like, road data associated with a corresponding position on the map, building data (a figure and a shape), or the like. The building data includes a three-dimensional shape, a type, a name, and the like of the building itself. The information stored in each of the first information storage 2 and the second information storage 3 is not limited to such a drawing object, but each of the first information storage 2 and the second information storage 3 can store various information to be displayed at the input/display unit 1.

Each of the first information storage 2 and the second information storage 3 is specifically embodied by a hard disk drive, a memory card, a DVD, a Blu-ray Disc, or the like.

The controller 4 controls each functional unit included in the map display device and causes the input/display unit 1 to display a map drawing picture. As shown in FIG. 1, the controller 4 analyzes user input information to form an extraction condition that relates to a drawing object and is necessary for formation of a map drawing picture. In a case where the controller 4 analyzes input information to comprehend user's intention of "search for peripheral expressway information", the controller 4 is capable of forming a condition for extracting a drawing object of ordinary roads around the current position and a drawing object of expressways around the current position.

The controller 4 further extracts a corresponding drawing object from each of the first information storage 2 and the second information storage 3 under the extraction condition, and causes the input/display unit 1 to display each of the extracted drawing objects in a desired mode. The controller 4 is specifically embodied by a computer (CPU) and a program thereof.

FIG. 2 particularly illustrates a detailed conceptual configuration of the controller 4 in the configuration of the map display device shown in FIG. 1.

The controller 4 includes an input analyzer 401, an overall controller 402, a first information drawing unit 403, a second information drawing unit 405, a first drawing picture holding unit 404, a second drawing picture holding unit 406, a synthetic drawing unit 407, a synthetic drawing picture holding unit 408, and a route information holding unit 409. The input analyzer 401 analyzes input information inputted from the input/display unit 1. The overall controller 402 controls the first information drawing unit 403, the second information drawing unit 405, and the synthetic drawing unit 407 in accordance with a result of the analysis by the input analyzer 401, and causes the input/display unit 1 to display a map drawing picture. The first information drawing unit 403 extracts a first drawing object as a drawing object stored in the first information storage 2 and draws, at the first drawing picture holding unit 404, a first drawing picture as a map drawing picture including the first drawing object. The second information drawing unit 405 extracts a second drawing object as a drawing object stored in the second information storage 3 and draws, at the second drawing picture holding unit 406, a second drawing picture as a map drawing picture including the second drawing object. The first drawing picture holding unit 404 holds the first drawing picture. The second drawing picture holding unit 406 holds the second drawing picture. The synthetic drawing unit 407 draws, at the synthetic drawing picture holding unit 408, a synthetic drawing picture from the first drawing picture and the second drawing picture. The synthetic drawing picture holding unit 408 holds the synthetic drawing picture formed by the synthetic drawing unit 407. The route information holding unit 409 holds information such as current position data in the device and route data to a destination of a vehicle as obtained by route search behavior. The input/display unit 1 displays, as a map drawing picture, the synthetic drawing picture held in the synthetic drawing picture holding unit 408.

The input analyzer 401 analyzes input information according to user's intention. More specifically, the input analyzer 401 analyzes a content displayed in a drawing picture and conditions such as a position touched on the display screen by a user and a motion, and identifies operation (e.g. equipment operation) according to the user's intention. User operation on the touch panel includes conventional simple touch operation of simply touching an icon (ordinary touch operation), or dynamic "gesture operation" such as "drag operation" or "flick operation" to be described later.

The overall controller 402 specifies a necessary drawing object on the basis of the analysis result, causes the first information drawing unit 403 to extract the first drawing object from the first information storage 2, and causes the second information drawing unit 405 to extract the second drawing object from the second information storage 3.

The first information drawing unit 403 forms a first drawing picture from the extracted first drawing object, and draws the first drawing picture at the first drawing picture holding unit 404 (memory unit). The first drawing picture is drawn by combining map data, road data, building data, and the like as map information in the extracted first drawing object. The first information drawing unit 403 adds the information held in the route information holding unit 409 to the first drawing picture and draws at the first drawing picture holding unit 404.

The second information drawing unit 405 forms a second drawing picture from the extracted second drawing object, and draws the second drawing picture at the second drawing picture holding unit 406 (memory unit). The second drawing picture is drawn by combining map data, road data, building data, and the like as map information in the extracted second drawing object. The second information drawing unit 405 is capable of adding, to the map drawing picture (the second drawing picture) thus formed, information generated in the device such as vehicle current position data or route data to a destination of the vehicle obtained by route search behavior, so as to draw at the second drawing picture holding unit 406.

The overall controller 402 causes the synthetic drawing unit 407 to synthesize the first drawing picture held in the first drawing picture holding unit 404 and the second drawing picture held in the second drawing picture holding unit 406 and draw at the synthetic drawing picture holding unit 408 (memory unit). The synthetic drawing picture is held in the synthetic drawing picture holding unit 408 (memory unit) and is then displayed at the input/display unit 1.

The synthetic drawing unit 407 forms the synthetic drawing picture by synthesizing the first drawing picture and the second drawing picture so as to be in entirely or partially overlapping manner while holding drawing contents of the first drawing picture and the second drawing picture. When the first drawing picture and the second drawing picture overlap each other, a drawing object in an upper drawing picture masks a drawing object in a lower drawing picture (the drawing object in the lower drawing picture is not displayed because the drawing object in the upper drawing picture is displayed).

Map information in the upper map drawing picture is typically visible in an overlapped portion. The drawing object in the lower drawing picture can be made visible by controlling an overlapping state. The "upper/lower" herein corresponds to the upper/lower direction along the normal line of a display screen and a closer side corresponds to the "upper" side. In fact, pieces of drawing picture data overlap conceptually.

The drawing objects displayed respectively in the map drawing pictures to be synthesized can have predetermined relevance therebetween. Examples of such predetermined relevance include relationship between positions of the vehicle on the maps coinciding or being in vicinity with each other, relationship on a travel route between a vehicle current position and a destination or the like, and temporal relationship between a current travel route and a past travel record of the vehicle.

The order of overlapping map drawing pictures can be decided in accordance with user's intention, e.g. for each combination of drawing objects. It is noted that the overlapping order can be changeable at any time. In this case, comprehension can be further facilitated by displaying in vertical relationship corresponding to actual spatial disposition (relationship between a map including an elevated road and a map including an ordinary road, or relationship between a ground map and an underground map). Specific vertical relationship can be defined for specific combination.

<Behavior>

Behavior of the map display device according to the embodiment 1 is briefly described next.

The map display device according to the present invention has the following four features. (1) Drawing objects including a picture background object displayed in an upper map drawing picture or an upper drawing picture are displayed in sizes smaller than those in a lower map drawing picture. (2) The upper map drawing picture is displayed so as to avoid a priority drawing object (a drawing object always visible to a user preferentially among drawing objects displayed in the drawing picture) displayed in the lower map drawing picture. (3) The upper map drawing picture can be slid by board slide (to be detailed later). (4) A content displayed in the upper map drawing picture and a content displayed in the lower map drawing picture have relevance therebetween. These features facilitate comprehension of the relevance between drawing objects in a plurality of map drawing pictures. The controller 4, particularly the overall controller 402, controls each functional unit during this behavior. The present embodiment exemplifies a case where the lower map drawing picture corresponds to the first drawing picture and the upper map drawing picture corresponds to the second drawing picture. Alternatively, the lower map drawing picture can correspond to the second drawing picture and the upper map drawing picture can correspond to the first drawing picture.

The feature (1) possibly includes the following three cases. While a case 1 is mainly described for convenience of explanation, it is noted that the present invention also includes cases 2 and 3.

Case 1: The upper drawing picture can be variable in size and freely shiftable to any overlapping position with the lower drawing picture.

Case 2: Although the upper drawing picture is identical in size with the lower drawing picture, the upper drawing picture includes a background object smaller than the drawing picture and any drawing object is drawn only on the background object, so that a portion other than the background object is displayed transparently and the upper map drawing picture is eventually displayed in a small size.

Case 3: In addition to the above, similar expression can be achieved in accordance with a H/W (hardware) structure or software processing.

The following description adopts a sliding method as a specific method of performing predetermined operation of updating the upper overlapped map drawing picture. According to the sliding method, the entire upper overlapped drawing picture is shifted successively, in other words, the drawing object in the upper overlapped drawing picture is shifted in a slide direction in association with sliding (hereinafter, also referred to as board slide). How to update the display position of the upper overlapped drawing picture can be changed by a mode of user operation to the display screen, presetting for combination of maps, or the like.

Figure 3:
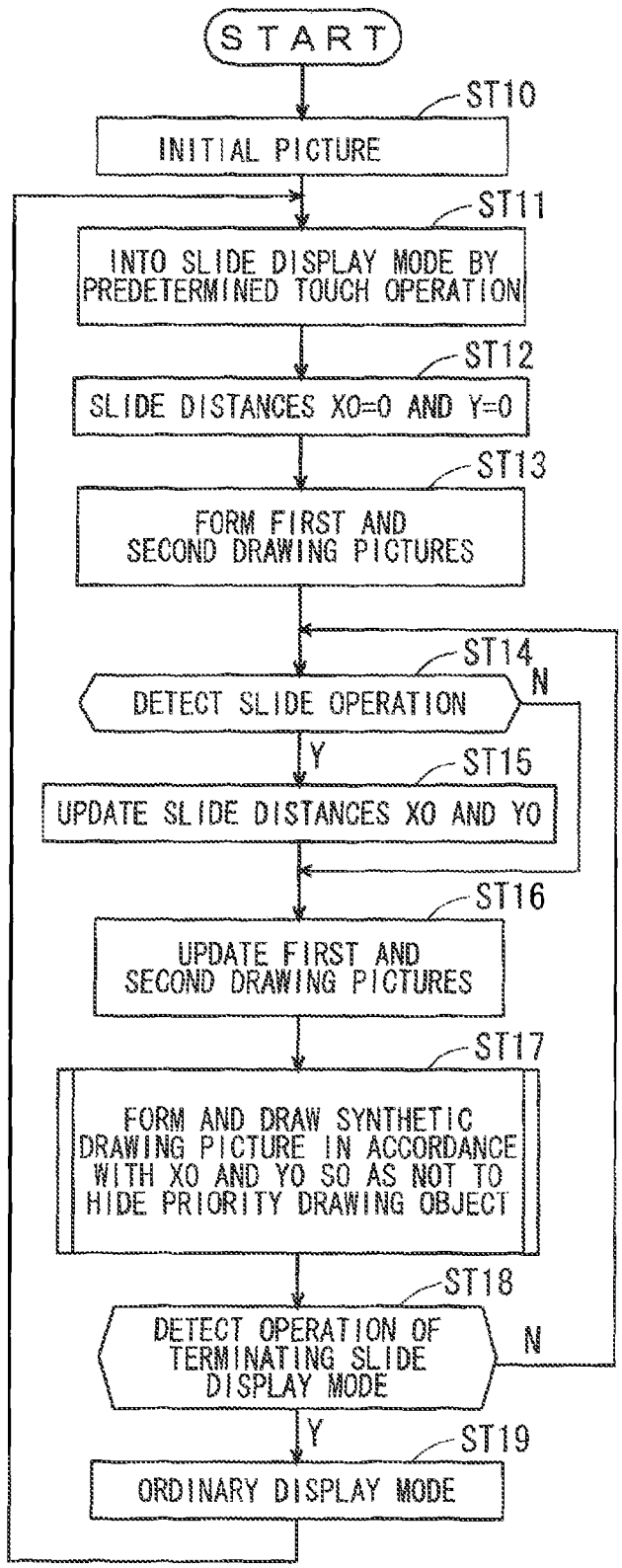
FIG. 3 is a flowchart illustrating behavior of the map display device.
Figure 4:
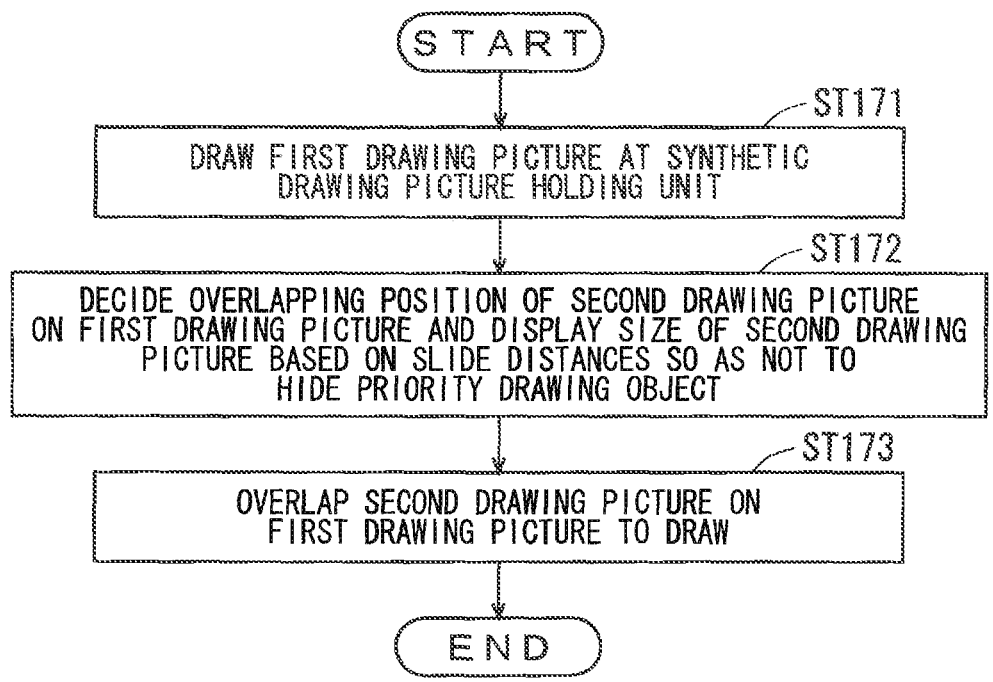
FIG. 4 is a flowchart illustrating behavior of the map display device.

Specific behavior is described with reference to FIG. 3.

Initially in step ST10, the map display device is turned on so as to cause the input/display unit 1 to display an initial picture. The initial picture can be in an ordinary display mode, that is, the mode of receiving ordinary touch operation.

Then in step ST11, predetermined operation is applied to the initial picture at the input/display unit 1 so as to transition into a slide display mode. In the slide display mode, the upper overlapped drawing picture can be updated using the sliding method described above.

This transition (transition from the ordinary display mode to the slide display mode) is performed by touch operation, button operation, icon operation, gesture operation, voice recognition, or the like to the initial picture.

Whether or not the mode has transitioned to the slide display mode can be checked by referring to a parameter that includes a type of the mode and is stored in the overall controller 402. For example, whether or not the slide display mode is selected can be determined on the basis of the fact that the parameter has a value larger or smaller than a predetermined threshold. The value of the parameter can be changed by user input, or can be changed automatically depending on preset conditions (including a state of the vehicle and a display state on the display screen). It will be usefully possible to easily check the display mode if an icon or the like indicating whether or not the slide display mode is selected is set to be displayed at the input/display unit 1.

When the display mode transitions to the slide display mode, slide distances X0 and Y0 are set to zero in step ST12.

In step ST13, a first drawing picture and a second drawing picture are formed. The first information drawing unit 403 and the second information drawing unit 405 form the pictures in accordance with user input information as described above. The first and second drawing pictures thus formed are drawn and held in the first drawing picture holding unit 404 and the second drawing picture holding unit 406, respectively.

Subsequently in step ST14, it is detected whether or not predetermined operation (slide operation) of updating the display position in the upper overlapped map drawing picture is performed. The input analyzer 401 analyzes gesture operation or the like at the input/display unit 1 to detect such operation. The process proceeds to step ST15 if slide operation has been detected. In contrast, the process returns to step ST16 if slide operation has not been detected.

Then in step ST15, the slide distances X0 and Y0 are updated in accordance with the slide operation.

Subsequently in step ST16, the drawing object displayed in each of the first drawing picture and the second drawing picture is updated. In this update, the range of the periphery of the vehicle displayed in the drawing picture, map information displayed as a drawing object (including road data, building data, data including a travel record, etc.), which are changed every moment due to travel of the vehicle, and the like are updated.

Subsequently in step ST17, a display position of the upper overlapped map drawing picture is decided so as to avoid a priority drawing object on the basis of the slide distances X0 and Y0, and a synthetic drawing picture is formed from the first drawing picture and the second drawing picture. Even when no slide is detected (N in step ST14 in FIG. 3), a display position of the upper overlapped map drawing picture is decided so as to avoid the priority drawing object, and a synthetic drawing picture is formed from the first drawing picture and the second drawing picture. The synthetic drawing picture thus formed is drawn, in other words, displayed, at the input/display unit 1. Details thereof are to be described later.

Then in step ST18, there is detected predetermined operation of terminating the slide display mode. The process proceeds to step ST19 if the operation has been detected. In contrast, the process returns to step ST14 if the operation has not been detected. The slide display mode can be terminated by touch operation, button operation, icon operation, gesture operation, voice recognition, or the like.

The display mode then transitions to the ordinary display mode in step ST19, and the process returns to step ST11.

Details of step ST17 are described next with reference to FIGS. 4 to 9. The synthetic drawing picture is updated in this step.

Initially in step ST171, the first drawing picture held in the first drawing picture holding unit 404 is drawn at the synthetic drawing picture holding unit 408.

Figure 5:
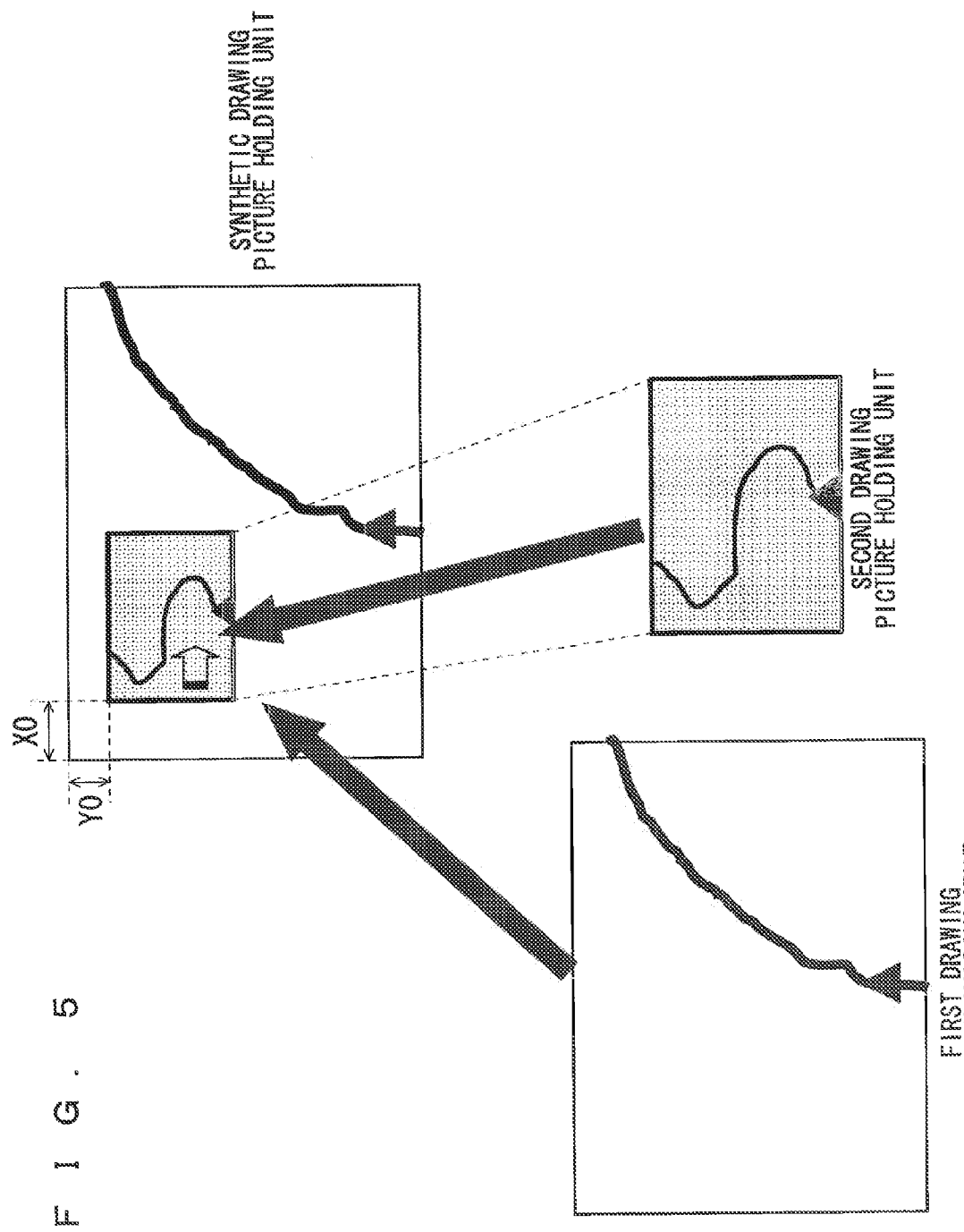
FIG. 5 is a view illustrating behavior of the map display device.

Subsequently in step ST172, an overlapping position of the second drawing picture on the first drawing picture and a display size of the second drawing picture are decided on the basis of the slide distances X0 and Y0 updated in accordance with slide operation. FIG. 5 schematically illustrates a method of synthesizing drawing pictures. As shown in FIG. 5, the entire second drawing picture overlaps on part of the first drawing picture, and the second drawing object partially masks the first drawing object.

If the slide distances X0 and Y0 are each updated to a value other than zero (other than an initial value if the initial value is not zero), an overlapping position of the second drawing picture on the first drawing picture is decided on the basis of the updated slide distances X0 and Y0. The slide distances can be updated when the second drawing picture automatically avoids a priority drawing object displayed in the first drawing picture. The slide distances can be also updated in accordance with a position touched by a user on the display screen during gesture operation or the like or a motion thereof. The slide distances can be also updated in a case where these conditions are combined with each other.

Then in step ST173, the second drawing picture is drawn in a state of overlapping on the first drawing picture in accordance with the overlapping position and the display size of the second drawing picture (overwriting data).

Details of step ST172 are described next with reference to FIGS. 6 to 8. An overlapping position of the second drawing picture on the first drawing picture and a display size of the second drawing picture upon formation of a synthetic drawing picture are decided in this step.

In the present embodiment 1, the input/display unit 1 includes priority drawing object designating means (not shown) for designating by a user a priority drawing object included in a drawing object related to map information, or a software sequence (not shown) for designating a priority drawing object. As described earlier, the priority drawing object is always visible to a user preferentially among drawing objects displayed in a drawing picture.

A user is capable of designating a priority drawing object by operation input to the input/display unit 1. The priority drawing object thus designated is stored in a priority drawing object storage (not shown) included in the controller 4.

In the present embodiment 1, it is assumed that a priority drawing object designated by a user is displayed in the first drawing picture (in other words, the priority drawing object is included in the first drawing object). It is also assumed that a user designates a priority drawing object at least prior to processing illustrated in FIG. 6. Hereinafter, unless otherwise specified, it is assumed that a priority drawing object designated by a user is a route. A triangular sign on a route indicates a current position of its own vehicle.

Figure 7:
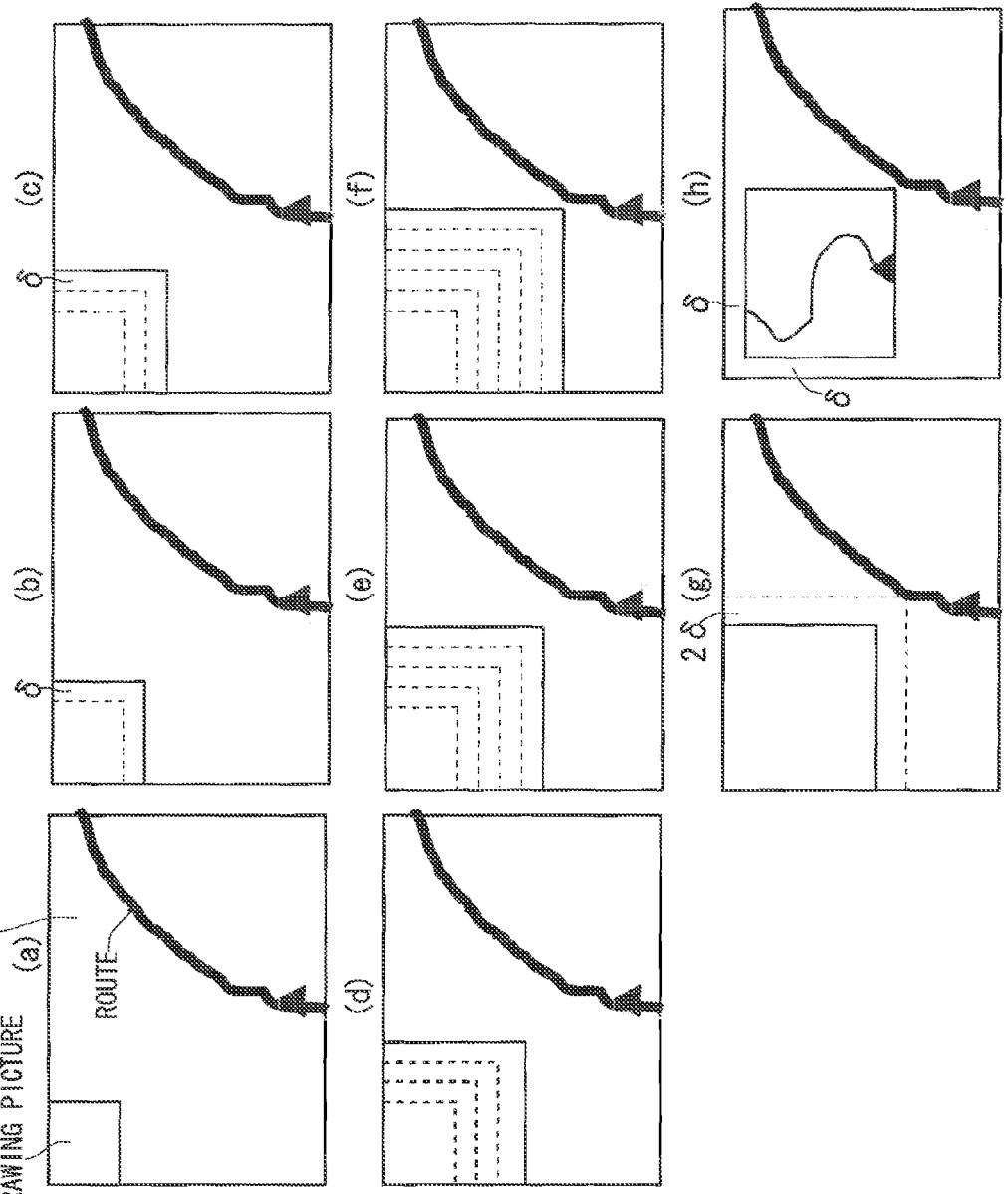
FIG. 7 is a view illustrating behavior of the map display device.

Initially in step ST1721, the entire second drawing picture overlaps on the first drawing picture and a display position and a display size of the second drawing picture are set so that the second drawing picture is located at an upper left position in the first drawing picture (see a portion (a) of FIG. 7). In other words, initial values of the second drawing picture are set. The display position of the second drawing picture set as the initial value can be anywhere other than the upper left position in the first drawing picture, and the display size can be arbitrarily preset by a user.

Then in step ST1722, it is determined whether or not the display region of the second drawing picture overlaps (hits) the route (priority drawing object) in the first drawing picture.

If the display region of the second drawing picture does not overlap the route in the first drawing picture in step ST1723, the display region of the second drawing picture is increased by δ. The processing in steps ST1722 and ST1723 is repetitively performed until the display region of the second drawing picture overlaps on the route in the first drawing picture portions (b) to (f) of FIG. 7).

If the display region of the second drawing picture overlaps on the route in the first drawing picture in step ST1724, the display region of the second drawing picture is decreased by 2δ (in other words, the display region of the second drawing picture is made apart from the route by a predetermined distance), and the display region thus decided is made to have the display size of the second drawing picture (a portion (g) of FIG. 7). The decided display size of the second drawing picture is stored in a second drawing picture size storage (not shown) in the overall controller 402. In this manner, the overall controller 402 controls so that the size (display region) of the second drawing picture located at a predetermined position with respect to the first drawing picture is repetitively enlarged by each predetermined size and the second drawing picture is made apart from the route (priority drawing object) by a predetermined distance when the second drawing picture partially overlaps a feature designated by a user.

Then in step ST1725, the entire display region of the second drawing picture is shifted rightward and downward by δ, the shifted position is set as a display position of the second drawing picture (a portion (h) of FIG. 7). The display position of the second drawing picture is obtained by adding X0 and Y0 (X0=δ and Y0=δ) to the initial value set in step ST1721 (see FIG. 5).

By this processing, the display position and the display size of the second drawing picture are automatically decided so as to avoid the priority drawing object in the first drawing picture when a synthetic drawing picture is formed from the first drawing picture and the second drawing picture overlapping each other. A user is thus capable of always seeing the priority drawing object (the route in the above example) when seeing a drawing picture (synthetic drawing picture) displayed on the display screen of the input/display unit 1.

In the above processing, the second drawing picture is eventually displayed as shown in the portion (h) of FIG. 7. The second drawing picture has only to be displayed so as to avoid the priority drawing object in the first drawing picture. For example, the second drawing picture can be displayed in the state shown in the portion (g) of FIG. 7.

FIG. 8 is a view exemplifying display of the second drawing picture in the present embodiment 1. FIG. 8 exemplifies display of the second drawing picture in a case where no slide operation is detected (N in step ST14 in FIG. 3).

As shown in FIG. 8, the first drawing picture displays a map including first drawing objects of a car navigation route and a position of its own car (a triangular sign in the figures). The second drawing picture displays, as the second drawing object, a map of an area wider than that of the map displayed in the first drawing picture. The priority drawing object in the first drawing picture designated by a user is assumed to be a route.

A portion (a) of FIG. 8 shows a state where the second drawing picture is displayed so as not to hit the route in the first drawing picture.

A portion (b) of FIG. 8 shows a state where the first drawing object in the first drawing picture and the second drawing object in the second drawing picture in the portion (a) of FIG. 8 are updated respectively. This update is executed in step ST16 in FIG. 3. As shown in the portion (b) of FIG. 8, the second drawing picture is changed (decreased) in display size in accordance with the position of the route in the first drawing picture.

A portion (c) of FIG. 8 shows a state where the first drawing object in the first drawing picture and the second drawing object in the second drawing picture in the portion (a) of FIG. 8 are updated respectively. The second drawing picture is displayed at an upper right position in the first drawing picture. As shown in the portion (c) of FIG. 8, when the region avoiding the route in the first drawing picture can be made larger at the upper right position rather than at the upper left position, the second drawing picture can be displayed at the upper right position. In other words, the second drawing picture can be made as large as possible while not overlapping the route.

Each of the portions (b) and (c) of FIG. 8 is on a constant scale even though the second drawing picture is varied in size, and displays the position of its own car at the center.

Alternatively, the second drawing picture can be displayed so as not to overlap the route while a predetermined size set by a user being the maximum display size, for example.

When the first drawing object in the first drawing picture and the second drawing object in the second drawing picture are updated respectively, the display position and the display size of the second drawing picture are thus changed automatically so as to avoid the route (priority drawing object) in the first drawing picture. A user is thus capable of always seeing the priority drawing object (the route in the above example) when seeing a drawing picture (synthetic drawing picture) displayed on the display screen of the input/display unit 1. A user can more easily see the second drawing picture when the second drawing picture is increased in display size as much as possible so as not to hit the route.

Display of the second drawing picture in a case where slide operation is detected (Y in step ST14 in FIG. 3) is described next.

For example, an overlapping start position where the upper left end of the second drawing picture is located (e.g. the initial value+δ as shown in the portion (h) of FIG. 7) is set with shift distances from a position on the display screen initially touched by a user (the slide distances X0 and Y0 in FIG. 5) being considered as offsets. Such operation of shifting an upper overlapped drawing picture along with predetermined touch operation (e.g. shifting a finger in a direction on the display screen at predetermined or lower speed) is called drag operation, and a mode of performing this operation is called a drag mode.

For example, an overlapping start position where the upper left end of the second drawing picture is located is set with shift distances from a position on the display screen initially touched by a user (the slide distances X0 and Y0 in FIG. 5) being considered as offsets. The picture is returned to the original overlapping position prior to touching and shifting, simultaneously when the user terminates the operation of touching the display screen. Such operation of shifting an upper overlapped drawing picture along with predetermined touch operation (e.g. shifting a finger in a direction on the display screen at predetermined or lower speed) and returning to the original overlapping position simultaneously upon termination of the touch operation is called shutter operation, and a mode of performing this operation is called a shutter mode. Shutter operation and drag operation can be distinguished from each other on the basis of the number of fingers touching the display screen, for example.

In a case where a user touches the display screen and performs a motion like flicking a playing card (a motion like flipping), the overlapping start position of the second drawing picture is set with an amounts increasing with time (the slide distances X0 and Y0 in FIG. 5 increasing with time) being considered as an offset. Such operation of shifting an upper overlapped drawing picture in a designated direction with predetermined touch operation and then shifting in accordance with predetermined inertia is called flick operation, and a mode of performing this operation is called a flick mode.

In the flick mode, flick operation is determined on the basis of any of the following conditions or by combination thereof, for example. (a) When a finger touches a touch panel and then quickly moves at predetermined or higher speed in a direction on the display screen, (b) when a finger presses the touch panel and then quickly moves with less press force at preliminarily predetermined or higher speed in a direction on the display screen, or (c) when a finger touches the touch panel, then quickly moves at preliminarily predetermined or higher speed in a direction on the display screen, and is slightly released from the touch panel (in which case the touch panel is required to recognize a three-dimensional position).

The speed set as predetermined speed in each of the conditions (a) to (c) can be different from each other.

Figure 9:
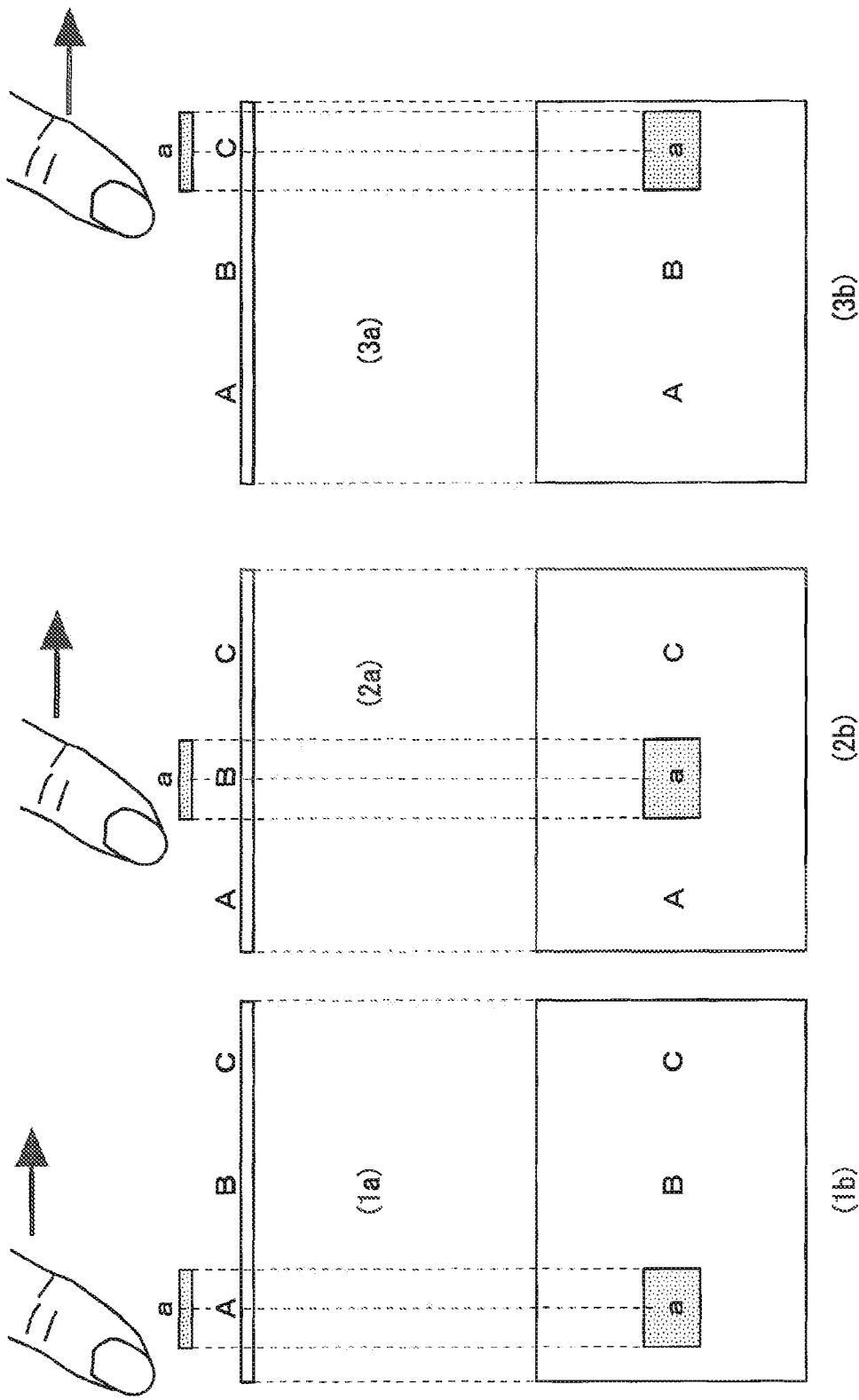
FIG. 9 shows views illustrating behavior of the map display device.

Performing slide operation as described above enables the motions (board slide) shown in FIG. 9.

In FIG. 9, a second drawing picture including a drawing object a and a second background drawing object overlaps on a first drawing picture including a drawing object A, a drawing object B, a drawing object C, and a first background drawing object. Regarding the first background drawing object and the second background drawing object, the first drawing picture and the second drawing picture are rectangular objects painted in cream, and the second picture is smaller in size than the first picture. The drawing object a is drawn on the second background drawing object in the second drawing picture.

In FIG. 9, portions (1*a*), (2*a*), and (3*a*) are pattern views of the lower first drawing picture and the upper second drawing picture seen in a lateral direction, whereas portions (1*b*), (2*b*), and (3*b*) are pattern views of the first drawing picture and the second drawing picture seen from above. The entire second drawing picture overlaps on the first drawing picture.

A user touches the input/display unit 1 with a finger and shifts the finger rightward in the figure (drag operation). In this case, the overlapping start position in the upper second drawing picture is updated sequentially (from 1*a* to 3*a* through 2*a*, or from 1*b* to 3*b* through 2*b*). The second drawing picture is displayed like being entirely placed on a board and slid (board slide).

More specifically, when the above slide motion is performed, the drawing object a in FIG. 9 is shifted rightward together with the second background drawing object like being placed on a board.

In the states of (1*a*) and (1*b*), the drawing object B and the drawing object C are displayed on the display screen whereas the drawing object A is masked by the second background drawing object and is not displayed.

In the states of (2*a*) and (2*b*), the drawing object A and the drawing object C are displayed on the display screen whereas the drawing object B is masked by the second background drawing object and is not displayed. Furthermore, relative positional relationship between the upper second drawing picture and the lower first drawing picture is changing continually in this case.

In the states of (3*a*) and (3*b*), the upper second drawing picture shifts further rightward, and the drawing object A and the drawing object B are displayed on the display screen whereas the drawing object C is masked by the second background drawing object and is not displayed. Furthermore, relative positional relationship between the upper second drawing picture and the lower first drawing picture is changing continually in this case.

The sliding method described above enables slide operation regardless of the position operated with touching or the like by a user in the display area of the second drawing picture. There can be alternatively limitation to the display range of the second drawing picture for accepting slide operation. For example, sliding of the second drawing picture can be acceptable when sliding gesture is performed in the vicinity of a boundary of the displayed second drawing picture.

The area accepting slide operation in the second drawing picture can be displayed by an icon or the like. In this case, it is possible to accept all of drag operation, flick operation, and transition of ordinary operation by simple touch operation. This leads to provision of a device of fine usability.

In the above example, the first information storage 2 and the second information storage 3 store the first drawing object and the second drawing object, respectively. The overall controller 402 can alternatively generate both or either one of the drawing objects through software processing. For example, the overall controller 402 can form a sign indicating the position of its own car in accordance with a program. The overall controller 402 can alternatively generate both or either one of the background drawing objects through software processing.

The above example refers to the method of rendering in the drawing picture the background drawing object as a rectangular drawing object. The method of generating a background drawing object is not limited to this method. In a case where the drawing picture itself has a function of generating a background color corresponding to a background drawing object, the overall controller 402 can set the background color of each of the first drawing picture holding unit 404 and the second drawing picture holding unit 406 through software processing.

In another case where the synthetic drawing unit 407 inputs setting of a background color of each of the first drawing picture and the second drawing picture to generate a synthetic drawing picture in accordance with the hardware structure or software processing, the overall controller 402 can set the background color of each of these drawing pictures through software processing.

A drawing object in the present invention has a concept including an object eventually displayed at the input/display unit 1 through software processing mentioned above.

Figure 10:
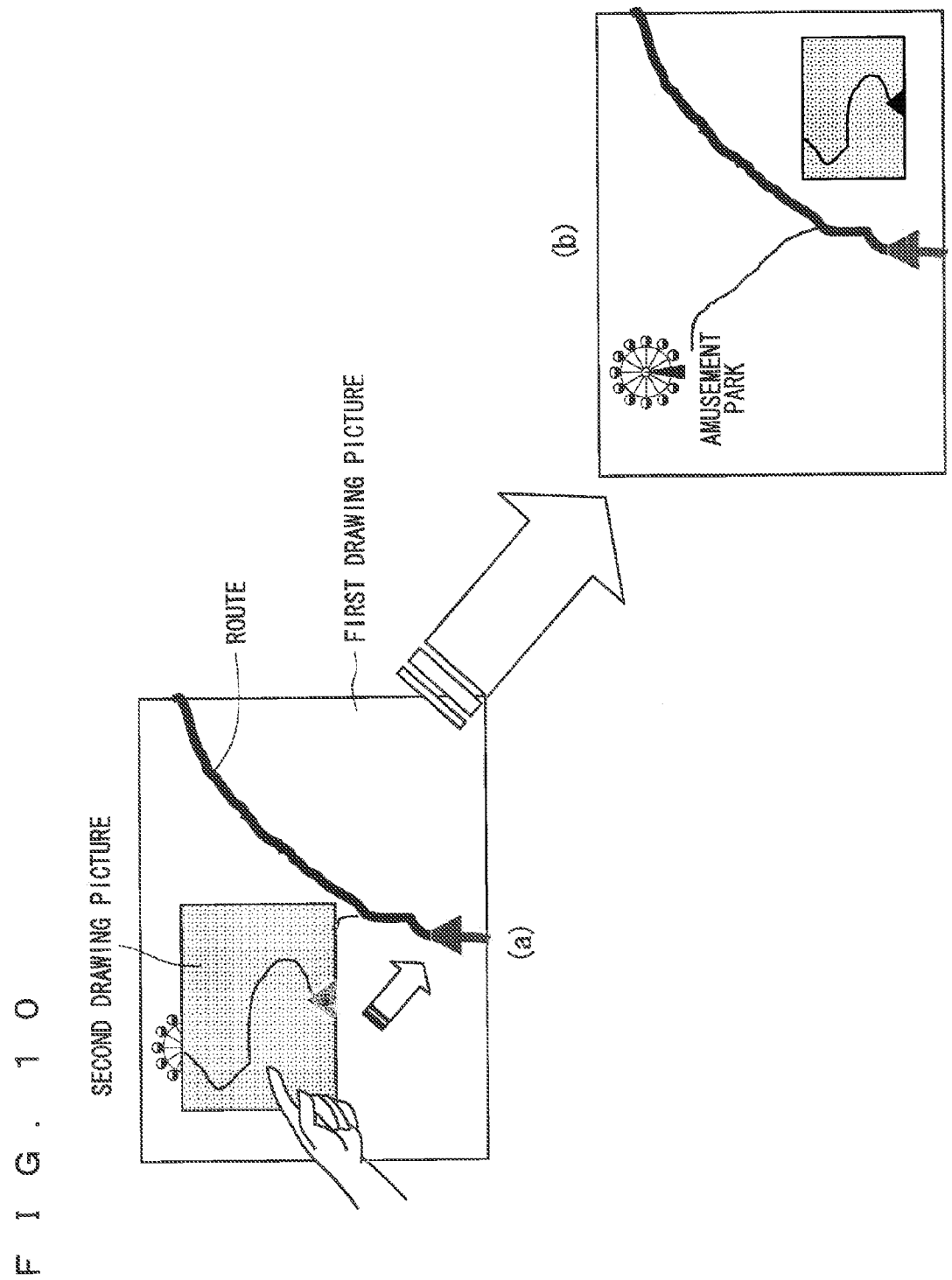
FIG. 10 is a view illustrating behavior according to a specific example, of the map display device.

FIG. 10 is a view exemplifying display of the second drawing picture in the present embodiment 1. FIG. 10 exemplifies display of the second drawing picture in a case where slide operation is detected (Y in step ST14 in FIG. 3).

In FIG. 10, the first drawing picture displays a map including first drawing objects of a car navigation route and a position of its own car (a triangular sign in the figures). The second drawing picture displays, as the second drawing object, a map of an area wider than that of the map displayed in the first drawing picture. The first drawing picture also displays information desired by a user (information on an amusement park in FIG. 10) at a position hidden (masked) by the second drawing picture. The priority drawing object in the first drawing picture designated by a user is assumed to be a route. For the purpose of better comprehension, the first background drawing object and the second background drawing object are different in color in FIG. 10. The present invention is, however, not limited to this case.

In a portion (a) of FIG. 10, the second drawing picture is displayed so as not to overlap the route in the first drawing picture. In the state of the portion (a) of FIG. 10, if a user wants to see information in the first drawing picture hidden by the second drawing picture and slides (drag operation or flick operation) the second drawing picture so as to be shifted to an opposite side of the route, the display position and the display size of the second drawing picture thus shifted are changed so that the shifted second drawing picture does not hit the route. More specifically, the overall controller 402 changes the position of the second drawing picture so as to be located on the opposite side of the route in accordance with input of user operation received by the input/display unit 1. Furthermore, the overall controller 402 slides the second drawing picture relatively to the first drawing picture so as to successively change the overlapping state between the first and second drawing pictures, and controls the overlapping state so that the second drawing picture does not overlap the priority drawing object designated by a user.

In this configuration, the user is capable of seeing information in the first drawing picture hidden by the second drawing picture in a state where the entire route is always displayed.

FIG. 10 shows the case where the second drawing picture is slid to be shifted to the opposite side of the route. Even when the second drawing picture is slid so as not to cross the route, the display position and the display size of the second drawing picture are changed so that the displayed second drawing picture does not hit the route. For example, in FIG. 8, even when the second drawing picture is slid from the state in the portion (b) of FIG. 8 to the state in the portion (c) of FIG. 8, the display position and the display size of the second drawing picture are changed so that the displayed second drawing picture does not hit the route.

The above example refers to drag operation. The second drawing picture can be alternatively returned to the display position before sliding (the portion (a) of FIG. 10) by shutter operation.

As shown in FIG. 11, the second drawing picture can be excluded from the display screen by flick operation. As shown in a portion (b) of FIG. 11, the first drawing picture can optionally display an icon notifying presence of the second drawing picture in this case. The second drawing picture can be retrieved to the original display position (a portion (a) of FIG. 11) when the icon is selected (touched). In place of this icon, the second drawing picture can be displayed as a small icon at a predetermined position (not shown) on the display screen. In this case, the second drawing picture can be retrieved to the original display position when this icon is selected (touched).

In these manners, when the second drawing picture is excluded from the display screen by flick operation, a user can recognize presence of the second drawing picture by an icon that is displayed to indicate presence of the second drawing picture.

FIG. 12 is a view exemplifying different display of the second drawing picture in the present embodiment 1.

In FIG. 12, the second drawing picture is displayed so as not to overlap the route in the first drawing picture. The first drawing picture displays a map including first drawing objects of a car navigation route and a position of its own car (a triangular sign in the figures). The second drawing picture displays, as the second drawing object, a, map of an area wider than that of the map displayed in the first drawing picture. The priority drawing object in the first drawing picture designated by a user is assumed to be a route. For the purpose of better comprehension, the first background drawing object and the second background drawing object are different in color in FIG. 12. The present invention is, however, not limited to this case.

As shown in portions (a) and (b) of FIG. 12, the second drawing picture can be displayed so as to avoid the route in the first drawing picture.

Furthermore, if a priority drawing object designated by a user is a home (an "H" sign in the figure) as shown in a portion (c) of FIG. 12, the second drawing picture can be displayed so as to avoid the home.

Moreover, as shown in a portion (d) of FIG. 12, as long as avoiding the route in the first drawing picture, the second drawing picture can have any shape other than a rectangular shape.

FIG. 13 is a view exemplifying still different display of the second drawing picture in the present embodiment 1.

In FIG. 13, the second drawing picture is displayed so as not to overlap the route in the first drawing picture. The first drawing picture displays a map including first drawing objects of a car navigation route and a position of its own car (a triangular sign in the figures). The second drawing picture displays, as the second drawing object, a map of an area wider than that of the map displayed in the first drawing picture. The first drawing picture also displays information desired by a user (information on an amusement park in FIG. 13) at a position hidden (masked) by the second drawing picture. The priority drawing object in the first drawing picture designated by a user is assumed to be a route. For the purpose of better comprehension, the first background drawing object and the second background drawing object are different in color in FIG. 13. The present invention is, however, not limited to this case.

In the state of a portion (a) of FIG. 13, if a user wants to see information in the first drawing picture hidden by the second drawing picture, it is assumed that the user slides the second drawing picture so as to be shifted to an opposite side of the route portions (b) and (c) of FIG. 17). In this case, a portion in the second drawing picture overlapping the route can be displayed transparently. More specifically, when the slid second drawing picture overlaps a priority drawing object designated by a user, the overall controller 402 controls so that the portion in the second drawing picture overlapping the priority drawing object is displayed transparently.

In this configuration, the user is capable of seeing, with simple operation, information in the first drawing picture hidden by the second drawing picture in a state where the entire route is always displayed.

FIG. 14 is a view exemplifying still different display of the second drawing picture in the present embodiment.

In FIG. 14, the second drawing picture is displayed so as not to overlap the route in the first drawing picture. The first drawing picture displays a map including first drawing objects of a car navigation route and a position of its own car (a triangular sign in the figures). The second drawing picture displays, as the second drawing object, a map of an area wider than that of the map displayed in the first drawing picture. The priority drawing object in the first drawing picture designated by a user is assumed to be a route. For the purpose of better comprehension, the first background drawing object, the second background drawing object, and a third background drawing object (a background object drawn in a third drawing picture to be described later) are different in color in FIG. 14, The present invention is, however, not limited to this case.

In the state in a portion (a) of FIG. 14, when a pop-up picture shown in a portion (b) of FIG. 14 (a route guide picture in FIG. 14 as the third drawing picture) is popped up (displayed), the second drawing picture is displayed so as to avoid the pop-up picture. Furthermore, the pop-up picture is displayed so as not to overlap the route.

When the pop-up picture is displayed as shown in a portion (c) of FIG. 14, the second drawing picture can be alternatively displayed three-dimensionally. This configuration facilitates visual distinction between the pop-up picture and the second drawing picture.

In this manner, when a pop-up picture is displayed, the second drawing picture can be displayed so as not to hide the pop-up picture. It is also possible to easily recognize which picture is slidable. This configuration improves user operability.

As described above, when the display screen displays a plurality of map pictures, the present embodiment 1 facilitates comprehension of the relevance between drawing objects in these map drawing pictures and improves user operability.

Figure 6:
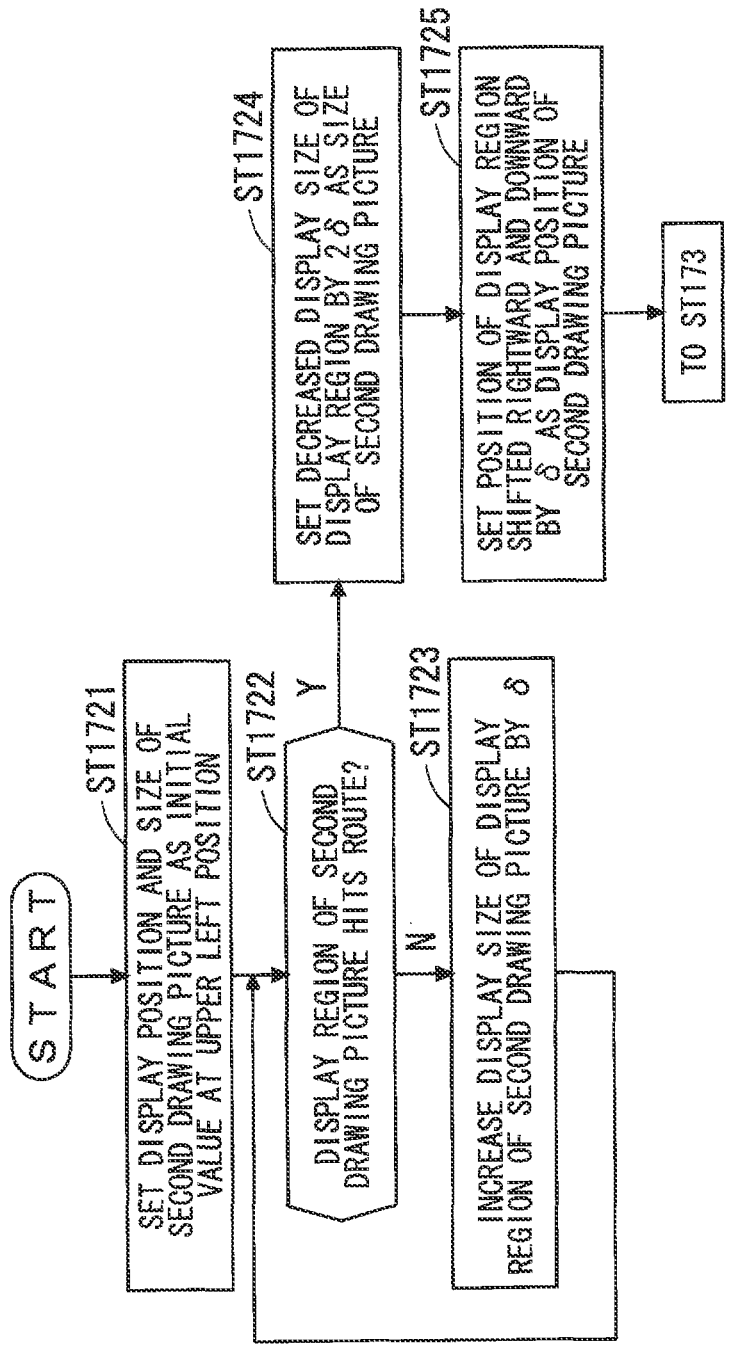
FIG. 6 is a flowchart illustrating behavior of the map display device.

In FIGS. 6 and 7, the display region of the second drawing picture is gradually increased by δ until the second drawing picture overlaps the route. The value δ can be arbitrarily set in this case. The initial position of the second drawing picture is not limited to the upper left position in the first drawing picture, but can be designated arbitrarily. More specifically, the display position and the display size of the second drawing picture have only to be set so that the display region of the second drawing picture does not overlap a priority drawing object in the first drawing picture designated by a user.

The present embodiment 1 assumes that the priority drawing object designated by a user is the route. The present invention is not limited to this case, but the priority drawing object can be a house, any registered spot, a point of interest (POI) having a predetermined attribute, a predetermined area, or the like.

The present embodiment further assumes that information displayed in the second drawing picture is the second drawing object related to map information (more specifically, each of the first drawing object and the second drawing object is information related to a travel route of a mobile object). The information displayed in the second drawing picture is not limited to such map information, but can be information relevant to map information displayed in the first drawing picture, such as POI information, traffic information, and fuel expense information (in other words, each of the first drawing object and the second drawing object is information related to a position of a mobile object on a map).

In FIGS. 8 and 10, the display size of the second drawing picture having been shifted is assumed to be changed automatically. Alternatively, the display size can be changed manually when a user touches the display screen of the input/display unit 1. For example, the display size of the second drawing picture can be increased or decreased by two-point touch (sliding while touching predetermined two points on the screen). The scale of the second drawing picture can be changed by gesture (e.g. sliding while touching one of four corners of the second drawing picture).

The input/display unit 1 includes the display screen, and the size of the first drawing picture can correspond to the entire display screen whereas the size of the second picture can correspond to part of the display screen.

The input/display unit 1 integrally includes an input unit for receiving user input information and a display for displaying a map drawing picture in accordance with the received input information and behavior control by the controller 4. The device can alternatively include separate configurations for achieving these functions. Furthermore, displayed information is not limited to a drawing object in a map drawing picture. It is possible to display various information in accordance with demand of a user.

When the touch panel is adopted to change overlap between drawing pictures in accordance with gesture operation as in the present embodiment 1, operation is facilitated. More specifically, in a conventional map display device, control is executed by touching an operation icon displayed on a touch panel or by handling a mechanical switch or a dial. The conventional device had a user interface not necessarily achieving fine usability. In contrast, the present invention adopts gesture operation that is applied to a portable terminal having a touch panel such as a so-called smartphone. This achieves a user interface of fine usability.

The present invention is effectively utilized when operation time is limited, such as a case of operating a map display device equipped on a vehicle. Furthermore, the present invention has high flexibility in change of overlap (shift directions and effects upon introduction and removal) and satisfies demand including an entertainment aspect for a user.

It is also possible to provide the user-friendly input modes for a user who is used to operating a touch panel and the like.

The input/display unit 1 can be embodied by not only an ordinary touch panel but also a three-dimensional touch panel that is of a capacitance detection type and is capable of detecting approach and contact of a finger.

The sliding method according to the present embodiment is just an example. A map drawing picture can be updated in the slide display mode by any method other than the sliding method of the present embodiment.

The embodiments of the present invention can be appropriately modified or removed within the scope of the invention.

DESCRIPTION OF REFERENCE SIGNS

1: input/display unit, 2: first information storage, 3: second information storage, 4: controller, 401: input analyzer, 402: overall controller, 403: first information drawing unit, 404: first drawing picture holding unit, 405: second information drawing unit, 406: second drawing picture holding unit, 407: synthetic drawing unit, 408: synthetic drawing picture holding unit, 409: route information holding unit

The invention claimed is:

1. A map display device that displays a plurality of drawing pictures including a first drawing picture and a second drawing picture in an at least partially overlapping manner,
    said first drawing picture displaying a first drawing object,
    said second drawing picture displaying a second drawing object,
    said first drawing object being a drawing object related to map information, and
    said second drawing picture or said second drawing object displayed in said second drawing picture being smaller in size than said first drawing picture,
    the map display device comprising:
    an input device that receives input of user operation related to display of a drawing picture;
    a computer processor programmed to execute a process comprising:
        storing a priority drawing object included in said first drawing object designated by input of user operation received by said input device,
        determining an overlapping state between said first and second drawing pictures in accordance with the input of user operation received by said input device,
        outputting, to a display device, a picture according to said overlapping state in which one of said first and second drawing objects masks the other in a portion in which said first and second drawing pictures overlap each other, and
        controlling, without user intervention, said overlapping state by modifying the position, shape, or size of said second drawing picture in response to changes in the content of said first drawing picture so as to prevent said priority drawing object as displayed in said first drawing picture from becoming blocked by said second drawing picture in said display device,
    wherein said controlling of said overlapping state keeps said second drawing picture apart from said priority drawing object by a predetermined distance, said process including storing the size of said second drawing picture relevant to the control of said computer processor.

2. The map display device according to claim 1, wherein said controlling of said overlapping state slides said second drawing picture relatively to said first drawing picture so as to successively change the overlapping state between said first and second drawing pictures.

3. The map display device according to claim 2, wherein, when said second drawing picture is slid to overlap said priority drawing object, said process transparently displays a portion in said second drawing picture overlapping said priority drawing object.

4. The map display device according to claim 1, wherein said controlling of said overlapping state modifies the size or a shape of said second drawing picture to prevent said second drawing picture from overlapping said priority drawing object.

5. The map display device according to claim 1, wherein said priority drawing object is a route on a map.

6. The map display device according to claim 5, wherein said controlling of said overlapping state changes the position of said second drawing picture so as to be located on an opposite side of said route in accordance with input of user operation received by said input device.

7. The map display device according to claim 1, wherein said controlling of said overlapping state repeatedly enlarges the size of said second drawing picture located at a predetermined position with respect to said first drawing picture by each predetermined size and keeps said second drawing picture apart from said priority drawing object by a predetermined distance when part of said second drawing picture overlaps said priority drawing object.

8. The map display device according to claim 1, wherein
said plurality of drawing pictures further includes a third drawing picture,
said third drawing picture includes a third drawing object, and
said process prevents said second drawing picture from overlapping said third drawing picture.

9. The map display device according to claim 1, wherein
the map display device is equipped on a mobile object, and
each of said first drawing object and said second drawing object is information related to a travel route of said mobile object.

10. The map display device according to claim 1, wherein
the map display device is equipped on a mobile object, and
each of said first drawing object and said second drawing object is information related to a position on a map of said mobile object.

11. The map display device according to claim 1, wherein
said display device includes a display screen, and
the size of said first drawing picture corresponds to entirety of said display screen and the size of said second drawing picture corresponds to part of said display screen.

12. The map display device according to claim 1, wherein said input device and said display device are integrally formed as a display device provided with a touch panel.

13. A map display method of displaying a plurality of drawing pictures including a first drawing picture and a second drawing picture in an at least partially overlapping manner,
said map display method being embodied by motions of a computer having an input device, a storage device, a display device, and a computer processor,
said first drawing picture displaying a first drawing object,
said second drawing picture displaying a second drawing object,
said first drawing object including a drawing object related to map information, and
said second drawing picture or said second drawing object displayed in said second drawing picture being smaller in size than said first drawing picture,
the map display method including the steps of:

(a) receiving, by said input device, input of user operation related to display of a drawing picture,
(b) storing, by said storage device, a priority drawing object included in said first drawing object designated by input of user operation received in said step (a);
(c) displaying, by said display device, said plurality of drawing pictures including said priority drawing object; and
(d) prior to said step (c), executing a process by said computer processor comprising:
determining an overlapping state between said first and second drawing pictures in accordance with the input of user operation received in said step (a),
masking one of said first and second drawing objects with the other in a portion in which said first and second drawing pictures overlap each other, and
controlling, without user intervention, said overlapping state by modifying the position, shape, or size of said second drawing picture in response to changes in the content of said first drawing picture so as to prevent said priority drawing object as displayed in said first drawing picture from becoming blocked by said second drawing picture in said display device,
wherein said controlling of said overlapping state keeps said second drawing picture apart from said priority drawing object by a predetermined distance, said method including storing the size of said second drawing picture relevant to the control of said computer processor.

14. A map display device that displays a plurality of drawing pictures including a first drawing picture and a second drawing picture in an at least partially overlapping manner,
said first drawing picture displaying a first drawing object,
said second drawing picture displaying a second drawing object,
said first drawing object being a drawing object related to map information, and
said second drawing picture or said second drawing object displayed in said second drawing picture being smaller in size than said first drawing picture,
the map display device comprising:
an input device that receives input of user operation related to display of a drawing picture;
a computer processor programmed to execute a process comprising:
storing a priority drawing object included in said first drawing object designated by input of user operation received by said input device,
determining an overlapping state between said first and second drawing pictures in accordance with the input of user operation received by said input device,
outputting, to a display device, a picture in which one of said first and second drawing objects masks the other in a portion in which said first and second drawing pictures overlap each other, and
controlling said overlapping state so as to prevent said priority drawing object in said first drawing picture from becoming invisible in said drawing picture display,
wherein said controlling of said overlapping state keeps said second drawing picture apart from said priority drawing object by a predetermined distance, said process including storing the size of said second drawing picture relevant to the control of said computer processor.

15. The map display device according to claim 14, wherein
    said controlling of said overlapping state slides said second drawing picture relatively to said first drawing picture so as to successively change the overlapping state between said first and second drawing pictures.

16. The map display device according to claim 14, wherein said controlling of said overlapping state additionally controls the size or a shape of said second drawing picture to prevent said second drawing picture from overlapping said priority drawing object.

17. The map display device according to claim 14, wherein said priority drawing object is a route on a map.

18. The map display device according to claim 14, wherein
    said display device includes a display screen, and
    the size of said first drawing picture corresponds to entirety of said display screen and the size of said second drawing picture corresponds to part of said display screen.

19. The map display device according to claim 14, wherein said input device and said display device are integrally formed as a display device provided with a touch panel.

\* \* \* \* \*